April 5, 1960
N. W. PATRICK ET AL
2,931,938
STORAGE TUBE CIRCUIT
Filed April 9, 1959
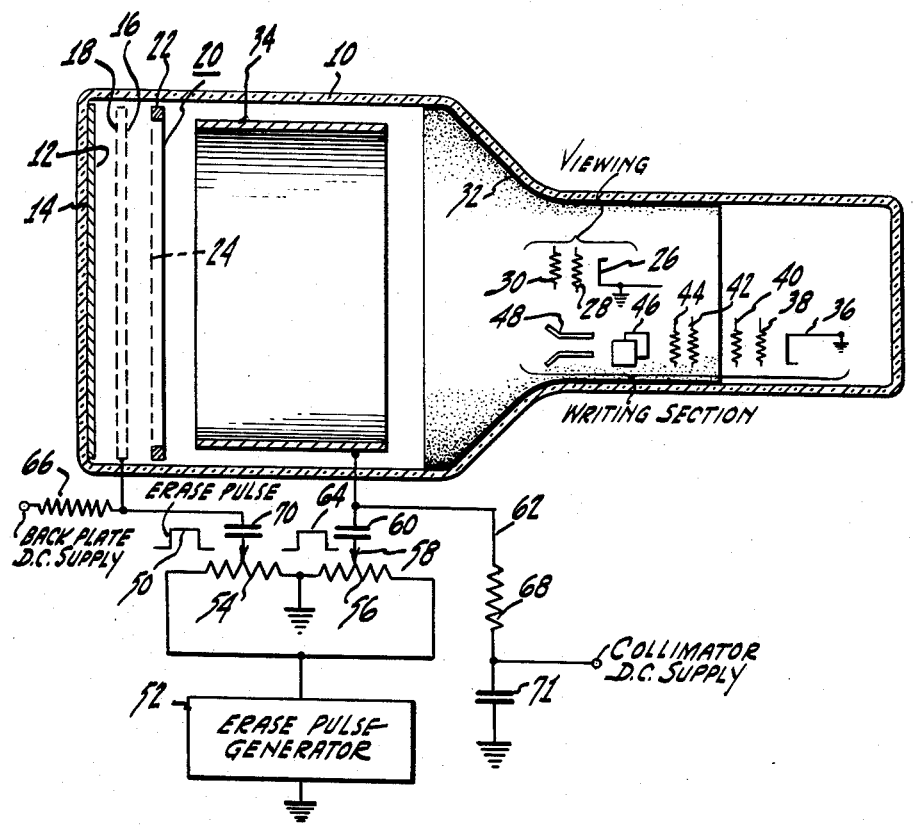
INVENTORS
NORMAN W. PATRICK &
WAYNE H. SANDFORD, JR
BY
ATTORNEY

United States Patent Office 2,931,938
Patented Apr. 5, 1960

2,931,938
STORAGE TUBE CIRCUIT

Norman W. Patrick, Lancaster, and Wayne H. Sandford, Jr., Landisville, Pa., assignors to Radio Corporation of America, a corporation of Delaware Application April 9, 1959, Serial No. 805,248

4 Claims. (Cl. 315—12)

The present invention relates to storage tubes and particularly to an improved circuit and method for erasing a direct view storage tube.

The visual display of a direct view storage tube, when operated utilizing pulsed erasure, includes an objectionable peripheral ring of intense illumination surrounding the useful viewing area. In one typical 5 inch direct view storage tube, the ring has been found to be about $\frac{1}{16}$ of an inch wide and 4 inches in diameter. The brightness of the ring is equal to the maximum brightness of the display under the same operating conditions.

Observers have objected to the presence of the bright ring described above. Light from the ring may, for example, be reflected internally from glass-air surfaces and thus make information at low brightness levels difficult to see. The ring also makes it difficult for the observer to become "dark adapted." Finally, under conditions of low ambient illumination, the bright ring adds unnecessarily to the ambient illumination, sometimes making the observation of other close-by instruments difficult.

Efforts to remove the bright ring by positioning opaque masks on the tube face are not usually practical because the exact diameter and location of the bright ring may vary with operating conditions and from tube to tube. Moreover, masking does not eliminate the objectionable glass-air surface reflections described above.

The object of the present invention is to provide a cheap, simple and effective means for eliminating the bright ring described above.

The viewing beam of a storage tube is the one which normally floods the storage grid with electrons. During the writing operation, electrons in the viewing beam pass through the storage grid and are accelerated toward and land on the phosphor screen. A visual display is thereby formed. The display may be erased by charging the storage grid sufficiently negative to prevent the passage of viewing beam electrons. This is normally done by applying positive pulses to the backplate of the storage grid thereby causing the viewing beam electrons to collect on the grid. However, as already mentioned, a bright circumferential ring remains on the viewing screen. The reason, it has been determined, is that the positive backplate causes the viewing beam diameter to shrink so that its electrons do not deposit on the circumferential edge of the storage grid and accordingly do not erase the charge pattern stored there.

According to the present invention, the bright ring is eliminated by applying a pulse to an appropriate electrode in the storage tube during the erase pulse interval in a sense to increase the viewing beam diameter. For example, a positive pulse may be applied to the collimator electrode synchronously with the positive pulse applied to the backplate. The circuit is quite simple and may include, for example, potentiometer means across which the erase pulse is applied having one tap connected to the storage grid backplate and another tap connected to the collimator electrode.

The invention will be described in greater detail by reference to the following description taken in connection with the accompanying drawing the single figure of which is a block and schematic diagram of a preferred form of the present invention.

The direct view storage tube shown in the figure includes an evacuated, glass envelope 10 within which is a phosphor viewing screen 12. The phosphor is bonded to a transparent conductive film 14 formed of a metal or a metallic compound such as tin oxide, for example. This film is normally maintained 5,000 to 10,000 volts positive and can be thought of as an anode. Located next to the screen is a target assembly consisting of a storage screen 16 and a backplate 18. The storage screen is a thin deposit of an insulating material such as a film of vitreous silica or magnesium fluoride of the order of several microns in thickness. The backplate 18 consists of a framework of a fine metallic mesh. The insulating material is sufficiently thin so that the size of the openings in the backplate remains essentially unchanged. In effect, the storage grid is a multiplicity of storage elements capacitively coupled to the backplate.

A collector electrode 20 is located next to the storage grid. It includes a metallic cylinder 22 supporting a grid structure 24 formed of a fine metal mesh. The collector, storage target and viewing screen are closely spaced and parallel.

The viewing section of the storage tube includes a cathode shown schematically at 26, a pair of grids 28 and 30, a conductive coating 32 on the inner part of the tube envelope, and a hollow, metallic cylinder 34. Electrode 34 is commonly known as the collimating electrode or more simply as the collimator.

The writing section of the tube includes a cathode 36, four grids 38, 40, 42 and 44 and electrostatic deflection plates 46 and 48. As will be explained in more detail later, the writing section produces a highly focused beam of high velocity electrons which are deflected across the storage grid and produce an electrostatic charge pattern thereon. The viewing beam, on the other hand, produces a flood beam of electrons which, during the viewing operation, either pass through the storage grid or are repelled by it to the collector 20.

*Writing operation*

The writing operation is essentially similar to that of any cathode ray tube. The electrons produced at cathode 36 are focused and accelerated by electrodes 38, 40, 42 and 44 to form a relatively high velocity electron beam of narrow cross-section. The beam may be modulated by applying a signal to one of the grids as, for example, grid 38. Appropriate sweep voltages are applied to the electrostatic deflection plates 46 and 48 so as to sweep the highly focused beam across the storage grid. The sweep may be rectilinear as, for example, is employed in television, radial as employed in P.P.I. radar, or any other type desired.

The writing beam electrons landing on the storage grid have sufficient velocity to produce a secondary electron emission ratio greater than unit. Thus, more electrons leave the storage grid than arrive and those elements on the storage grid scanned by the beam assume a less negative charge wherever the writing beam strikes. Because the secondary electrons are attracted to the collector electrode 20, the writing beam tends to charge the storage grid to its potential. However, the maximum potential to which an element of the storage grid rises above cut off is limited in normal operation by the viewing gun flood beam to a potential just slightly more positive than that of the viewing gun cathode.

The writing beam electrons which land on the storage grid elements determine the voltage built up across the dielectric and the corresponding net charge stored in the dielectric. By controlling the amplitude and duration of the writing beam current, it is possible to establish on any storage element a positive charge having a value which will partially or completely counteract that element's negative charge. Consequently a storage element can be charged to any potential between the storage grid cut-off voltage and zero voltage. As will be explained in more detail below, the potential of each storage element determines the number of viewing beam electrons passing through the storage grid in the immediate vicinity of that element. This, in turn, controls the visual display which is produced.

*Viewing operation*

The viewing gun provides a low velocity electron stream which continuously floods the storage grid 16. Electrode 34 and to some extent electrode 32 collimate (make parallel) the paths of the electrons in the stream before they reach the storage grid. Collimation is required so that the low velocity electrons will approach the storage grid perpendicularly to the plane of the storage grid. This type of approach together with the uniform velocity of the electrons in the view beam make possible uniform control of the electrons by the storage grid.

When the viewing beam is sufficiently negative, say on the order of −6 to −10 volts or so, with respect to the viewing beam cathode 26 (which is normally at ground potential), the storage grid 16 repels the electrons and they are captured by the collector 20. Thus, no viewing beam electrons can pass through the storage grid and the viewing beam is said to be cut off.

When the storage grid is at the same potential as the viewing gun cathode, electrons in the viewing beam approach sufficiently close to the storage grid 16 that the high voltage field of anode-electrode 14 attracts these electrons. Under the influence of this field these electrons penetrate the openings in the storage grid and are accelerated toward and strike the phosphor viewing screen 12. They thereby cause the viewing screen to fluoresce brightly over its entire area. Under this condition, the brightness of the screen is designated as "saturated brightness."

At values of the storage grid potential between those which produce viewing beam cut-off and those which produce saturation brightness, the number of electrons which penetrate the storage grid openings, and hence the amount of light emitted by the screen, is a function of the storage grid potential. Thus, if a charge pattern is established on the screen at voltages which vary from about zero volts to a value somewhat under that producing saturation brightness, varying amounts of viewing beam electrons will pass through different portions of the screen depending upon the potentials present. These electrons strike the phosphor and produce a visual display corresponding to the charge pattern.

*Erasing*

In the tube operation as described so far, no viewing beam electrons are actually captured by the storage grid. They either pass through it or are repelled by it. However, if the storage grid is made positive, by applying a sufficiently positive voltage to the backplate 18, for example, the viewing beam electrons are attracted to the surface of the storage grid and land on it. If the electrons which land do not have sufficient energy to produce a secondary electron emission ratio in excess of unity, a net flow of current into the storage grid will result. A negative charge is thereby produced on the storage grid which effectively cuts off the viewing beam and thereby erases the displayed image. For example, assume the backplate is normally maintained at 2 volts positive and the initial charge on the storage grid is zero volts. If the backplate potential is raised to +10 volts, the storage grid is raised to +8 volts. The viewing beam electrons then charge the storage grid until its voltage drops to zero volts. Removal of the positive pulse from the backplate returns the backplate to +2 volts and this drives the storage grid to −8 volts. This negative voltage effectively cuts off the viewing beam and thereby erases the charge pattern on the storage screen.

As mentioned above, the direct view storage tube display is erased by applying a positive pulse or a series of positive pulses to the backplate 18. One such pulse is shown at 50 and it is produced in an erase pulse generator 52. The amplitude of the pulse is controlled at potentiometer 54.

It has been found that the erase pulse applied to the backplate affects the viewing beam diameter, making it smaller. Accordingly, the viewing beam electrons which must be captured by the storage screen to erase the charge pattern recorded thereon and thereby to erase the visual display do not reach the peripheral or circumferential edge of the storage grid. This is highly undesirable as explained in the introductory portions of the application as the circumferential edge of the display is not erased and the bright ring remains.

The bright ring is eliminated according to the present invention by applying a similar erase beam broadening pulse 64 to the collimating electrode 34. A second potentiometer 56 is connected in parallel with the potentiometer 54 at the output of the erase pulse generator 52. The pulse present at the slider 58 of the potentiometer 56 is applied through coupling capacitor 60 and lead 62 to the collimating electrode.

The two potentiometers 54 and 56 provide means for adjusting the relative amplitudes of the erase pulse 50 and the beam broadening pulse 64.

In a typical circuit designed to eliminate the bright ring in several typical, commercially available, direct-view storage tubes, the following components were employed.

Potentiometers 54 and 56 _____ 500 ohms each.
Supply resistors 66 and 68 _____ 5,000 ohms.
Decoupling capacitor 71 _____ 1 microfarad.
Capacitors 60 and 70=.002×the erase pulse width.

where the pulse width is in microseconds and the resultant value of capacitance is in microfarads.

The voltages applied to the various elements of the storage tube will depend upon the specific storage tube in use. Typical values are as follows:

Anode 14 _____ +5,000 to +10,000 volts.
Backplate 18 _____ 0 to +5 volts.
Collector 20 _____ +150 to +210 volts.
Collimator 34 _____ +30 to +150 volts.
Electrode 32 _____ +10 to +50 volts.
Cathode 26 _____ 0 volts.
Cathode 36 _____ 1,500 to −2,000 volts.

Further details of a typical, commercially available tube such as is illustrated in the figure may be found in the Technical Bulletin describing the RCA–7315 Display Storage Tube. This bulletin was published in November 1958 by the Electron Tube Division of the Radio Corporation of America, Harrison, New Jersey.

The storage tube illustrated in the figure and for which typical voltages have been given is similar to the RCA Display Storage Tube 7315. However, the invention is not limited in application to this specific tube but may be used, in general, with any direct view storage tube in which stored data must be erased.

What is claimed is:

1. In combination, a direct view storage tube including a charge storage member, means for directing a viewing beam at said charge storage member, and a collimating electrode through which said viewing beam passes; means for applying a positive pulse to said charge storage member for erasing the same; and means for simultaneously applying a positive pulse to said collimating electrode for increasing the diameter of said viewing beam.

2. In a circuit for erasing a direct view storage tube having a charge storage member and a collimating electrode, potentiometer means having two taps across which a positive-going erase pulse may be applied, one tap on said potentiometer means being connected to said charge storage member, and said other tap on said potentiometer means being connected to said collimating electrode.

3. In combination, a direct view storage tube including a charge storage member, means for directing a viewing beam at said charge storage member, and a collimating electrode through which said viewing beam passes; erase pulse generator means connected to said charge storage member for applying a positive-going pulse to the same; and circuit means coupled to said erase pulse generator for applying a portion of said positive-going portion to said collimating electrode.

4. In combination, a direct view storage tube including a charge storage member, means for directing a viewing beam at said storage member to provide a visible stored display, means for erasing said visible stored display resulting in contraction of said viewing beam and an undesired peripheral unerased display portion, and means for simultaneously expanding said viewing beam during the erasing interval for eliminating said peripheral unerased portion.

References Cited in the file of this patent

UNITED STATES PATENTS

| 2,790,929 | Herman et al. | Apr. 30, 1957 |
| 2,818,524 | Smith et al. | Dec. 31, 1957 |
| 2,873,404 | Stove | Feb. 10, 1959 |